US012381925B2

(12) United States Patent
Li et al.

(10) Patent No.: US 12,381,925 B2
(45) Date of Patent: Aug. 5, 2025

(54) METHOD AND APPARATUS FOR CONFIGURING AUDIO-VIDEO CONFERENCE, SERVER, AND STORAGE MEDIUM

(71) Applicant: Beijing Zitiao Network Technology Co., Ltd., Beijing (CN)

(72) Inventors: Mengliang Li, Beijing (CN); Zeguo Kang, Beijing (CN); Zhilei Qin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/746,935

(22) Filed: Jun. 18, 2024

(65) Prior Publication Data

US 2024/0340325 A1 Oct. 10, 2024

Related U.S. Application Data

(63) Continuation of application No. PCT/CN2023/074825, filed on Feb. 7, 2023.

(30) Foreign Application Priority Data

Feb. 25, 2022 (CN) .......................... 202210178119.2

(51) Int. Cl.
*H04L 65/403* (2022.01)
*G06Q 10/10* (2023.01)
*H04L 65/1093* (2022.01)

(52) U.S. Cl.
CPC ......... *H04L 65/403* (2013.01); *G06Q 10/103* (2013.01); *H04L 65/1093* (2013.01)

(58) Field of Classification Search
CPC .......................... G06Q 10/103; H04L 65/403
(Continued)

(56) References Cited

U.S. PATENT DOCUMENTS

| 2010/0223334 A1 | 9/2010 | Narayanan et al. |
| 2015/0163066 A1 | 6/2015 | DeRosa et al. |

(Continued)

FOREIGN PATENT DOCUMENTS

| CN | 102724475 A | 10/2012 |
| CN | 102215238 B | 12/2013 |

(Continued)

OTHER PUBLICATIONS

International Search Report and Written Opinion received for PCT Patent Application No. PCT/CN2023/074825, mailed on May 25, 2023, 10 pages (2 pages of English Translation and 8 pages of Original Document).

(Continued)

*Primary Examiner* — Maria El-Zoobi

(57) ABSTRACT

The present disclosure relates to a method and apparatus for configuring an audio-video conference, a server, and a storage medium. According to the present disclosure, a third-party application server initiates a conference configuration request to submit a conference configuration to an audio-video conference server, so that the audio-video conference server can control a conference behavior of a corresponding user by finding a behavior configuration corresponding to a user identification of a participating user from the conference configuration. Thus, a third party can freely customize a conference behavior according to a role requirement thereof, efficiently meeting the requirement of customizing various conference behaviors based on roles.

12 Claims, 5 Drawing Sheets

(58) Field of Classification Search
USPC .............................................. 348/14.02–14.9
See application file for complete search history.

(56) References Cited

U.S. PATENT DOCUMENTS

| | | | |
|---|---|---|---|
| 2015/0200786 A1* | 7/2015 | Stott | G06Q 10/1093 |
| | | | 709/204 |
| 2016/0119258 A1 | 4/2016 | Uzelac et al. | |
| 2016/0165184 A1 | 6/2016 | Aaron et al. | |
| 2017/0201720 A1 | 7/2017 | Liu et al. | |
| 2021/0374391 A1* | 12/2021 | Jorasch | G06V 40/19 |

FOREIGN PATENT DOCUMENTS

| | | |
|---|---|---|
| CN | 104980686 A | 10/2015 |
| CN | 107358402 A | 11/2017 |
| CN | 107707868 A | 2/2018 |
| CN | 108156000 A | 6/2018 |
| CN | 110266996 A | 9/2019 |
| CN | 110719428 A | 1/2020 |
| CN | 110769187 A | 2/2020 |
| CN | 111224792 A | 6/2020 |
| CN | 111327868 A | 6/2020 |
| CN | 112218035 A | 1/2021 |
| CN | 112492254 A | 3/2021 |
| CN | 113099155 A | 7/2021 |
| CN | 113222200 A | 8/2021 |
| CN | 114554134 A | 5/2022 |
| CN | 114554134 B | 9/2023 |
| JP | 2010-034694 A | 2/2010 |
| JP | 2010504041 A | 2/2010 |
| JP | 2013-232819 A | 11/2013 |
| WO | 2013/185485 A1 | 12/2013 |
| WO | 2021/164260 A1 | 8/2021 |
| WO | 2022/022127 A1 | 2/2022 |
| WO | 2023/160385 A1 | 8/2023 |

OTHER PUBLICATIONS

Notice of Allowance received from Chinese patent application No. 202210178119.2 mailed on Aug. 17, 2023, 7 pages (2 pages English Translation and 5 pages Original Copy).

Office action received from Chinese patent application No. 202210178119.2 mailed on Jun. 16, 2023, 24 pages (10 pages English Translation and 14 pages Original Copy).

Notice of Reasons for Refusal for Japanese Application No. 2024-535700, mailed Dec. 3, 2024, 6 pages.

Extended Search Report for EP Appl. No. 23759010.4 mailed Feb. 18, 2025, 10 pages.

* cited by examiner

METHOD AND APPARATUS FOR CONFIGURING AUDIO-VIDEO CONFERENCE, SERVER, AND STORAGE MEDIUM

CROSS-REFERENCE TO RELATED APPLICATION

This application is a continuation of International Application No. PCT/CN2023/074825 filed on Feb. 7, 2023, which claims the priority to and benefits of Chinese Patent Application No. 202210178119.2, filed on Feb. 25, 2022. All the aforementioned patent applications are hereby incorporated by reference in their entireties.

TECHNICAL FIELD

Embodiments of the present disclosure relate to a method and apparatus for configuring an audio-video conference, a server, and a storage medium.

BACKGROUND

An audio-video conference service may provide a plurality of open Application Programming Interfaces (APIs), and a third-party application may achieve the purpose of embedding the audio-video conference service in a third-party application scenario by invoking these APIs. For example, if the third-party application is an interview system needing to use the video call function, the interview system may use the video call function by invoking the API provided by the audio-video conference service and embed the audio-video conference service in the interview scenario.

However, the third-party application is often based on a particular business scenario, and conference behaviors of participants need to be customized correspondingly based on roles of the participants in the business scenario. For example, in the interview scenario, the participants play different roles, such as an interviewer and a candidate, and different conference behaviors need to be customized separately.

To complete the customization of the conference behaviors based on roles, a way employed currently is to preset behaviors of some roles by the audio-video conference service and provide the customization capability for these preset roles. This way has the problem that the audio-video conference service can only provide limited customized roles and has no extendibility. For a certain role, if the audio-video conference service does not provide customization, the third-party application cannot use the role. Therefore, this way of providing customized roles cannot meet the requirements of extensive third-party applications.

SUMMARY

The present disclosure provides a method and apparatus for configuring an audio-video conference, a server, and a storage medium.

In a first aspect, the present disclosure provides a method for configuring an audio-video conference, which includes: in response to receiving a conference configuration request initiated by a third-party application server, generating a conference identification corresponding to the conference configuration request, in which the conference configuration request includes a conference configuration, the conference configuration includes at least one behavior configuration, and the behavior configuration is configured to define a conference behavior of at least one user; storing the generated conference identification correspondingly to the conference configuration; and returning the generated conference identification to the third-party application server.

In some optional implementations, the method further includes: in response to receiving a conference joining request initiated by a target client, determining a target conference configuration corresponding to a target conference identification, in which the conference joining request includes a target user identification and the target conference identification; determining a target user behavior configuration corresponding to the target user identification based on the target user identification and the target conference configuration; and controlling a conference behavior of a target user indicated by the target user identification based on the target user behavior configuration.

In some optional implementations, the behavior configuration includes a user identification set and a conference behavior identification set; and the determining the target user behavior configuration corresponding to the target user identification based on the target user identification and the target conference configuration, includes: determining a behavior configuration matching the target user identification in the target conference configuration; and determining a conference behavior indicated by a conference behavior identification set in the determined behavior configuration as the target user behavior configuration.

In some optional implementations, the controlling a conference behavior of the target user indicated by the target user identification based on the target user behavior configuration, includes: determining whether the target user meets a condition for performing the conference behavior corresponding to the target user behavior configuration based on at least one of the target user identification, a tenant identification to which the target user belongs, and a user type of the target user; and controlling the conference behavior of the target user based on the target user behavior configuration in response to determining that the target user meets the condition.

In some optional implementations, the behavior configuration is configured based on a role to which a user belongs, and the role to which the user belongs is determined by the third-party application server.

In a second aspect, the present disclosure provides an apparatus for configuring an audio-video conference, which includes: a conference identification generation module, configured to, in response to receiving a conference configuration request initiated by a third-party application server, generate a conference identification corresponding to the conference configuration request, in which the conference configuration request includes a conference configuration, the conference configuration includes at least one behavior configuration, and the behavior configuration is configured to define a conference behavior of at least one user; a storage module, configured to store the generated conference identification correspondingly to the conference configuration; and a sending module, configured to return the generated conference identification to the third-party application server.

In some optional implementations, the apparatus further includes: a determination module, configured to: in response to receiving a conference joining request initiated by a target client, determine a target conference configuration corresponding to a target conference identification, in which the conference joining request includes a target user identification and the target conference identification; and determine a target user behavior configuration corresponding to the target user identification based on the target user identification and the target conference configuration; and a control module, configured to control a conference behavior of a target user indicated by the target user identification based on the target user behavior configuration.

In a third aspect, the present disclosure provides a method for configuring an audio-video conference, which includes: initiating a conference configuration request to an audio-video conference server, in which the conference configuration request includes a conference configuration, the conference configuration includes at least one behavior configuration, and the behavior configuration is configured to define a conference behavior of at least one user; and in response to receiving a conference identification returned by the audio-video conference server in response to the conference configuration request, sending the conference identification to a participant client corresponding to the conference configuration request, in which the participant client initiates a conference joining request to the audio-video conference server based on the conference identification.

In some optional implementations, before the initiating the conference configuration request to the audio-video conference server, the method further includes: receiving a business scenario request initiated by a client, in which the business scenario request includes at least one user role configuration, and the user role configuration includes a role identification and a corresponding user identification; for each user role configuration, determining a conference behavior identification corresponding to a role identification in the user role configuration according to a preset correspondence between a role identification and a conference behavior identification set, and generating a corresponding behavior configuration based on the determined conference behavior identification and a user identification in the user role configuration; and generating the conference configuration based on each generated behavior configuration.

In a fourth aspect, the present disclosure provides an apparatus for configuring an audio-video conference, which includes: an initiation module, configured to initiate a conference configuration request to an audio-video conference server, in which the conference configuration request includes a conference configuration, the conference configuration includes at least one behavior configuration, and the behavior configuration is configured to define a conference behavior of at least one user; and a transceiver module, configured to, in response to receiving a conference identification returned by the audio-video conference server in response to the conference configuration request, send the conference identification to a participant client corresponding to the conference configuration request, in which the client initiates a conference joining request to the audio-video conference server based on the conference identification.

In some optional implementations, the transceiver module is further configured to receive a business scenario request initiated by a client, in which the business scenario request includes at least one user role configuration, and the user role configuration includes a role identification and a corresponding user identification; and the apparatus further includes: a generation module, configured to: for each user role configuration, determine a conference behavior identification corresponding to a role identification in the user role configuration according to a preset correspondence between a role identification and a conference behavior identification set, and generate a corresponding behavior configuration based on the determined conference behavior identification and a user identification in the user role configuration; and generate the conference configuration based on each generated behavior configuration.

In a fifth aspect, the present disclosure provides a server, which includes one or more processors and a storage apparatus on which one or more programs are stored, and the one or more programs, when executed by the one or more processors, cause the one or more processors to implement the method according to the first aspect or the method according to the third aspect.

In a sixth aspect, the present disclosure provides a computer-readable storage medium on which a computer program is stored, and the computer program, when executed by one or more processors, implements the method according to the first aspect or the method according to the third aspect.

To solve the problem that the audio-video conference service may only provide limited customized roles, has no extendibility, and cannot meet the requirements of extensive third-party applications, the present disclosure provides a method and apparatus for configuring an audio-video conference, a server, and a storage medium. A third-party application server initiates a conference configuration request to convert role requirements into a conference configuration and submits the conference configuration to an audio-video conference server, so that the audio-video conference server can find a behavior configuration corresponding to a user identification of a participating user from the stored conference configuration to control a conference behavior of a corresponding user in a subsequent conference process. Thus, the third-party application server can customize corresponding conference behaviors according to the role requirements. Compared with an existing solution of providing customized roles by the audio-video conference service, the present disclosure allows for free customization of conference behaviors, solves the problem of limited customized roles, and improves the extendibility, thereby efficiently meeting the requirement of customizing various conference behaviors based on roles. Thus, the present disclosure improves the open capacity of the audio-video conference, can provide the conference behavior customization capability for participants of different roles in different business scenarios, and can well support most of application scenarios in the industry.

BRIEF DESCRIPTION OF DRAWINGS

Other features, objectives, and advantages of the present disclosure will become more apparent after reading the detailed descriptions of non-limiting embodiments made with reference to the following drawings.

DETAILED DESCRIPTION

Figure 1:
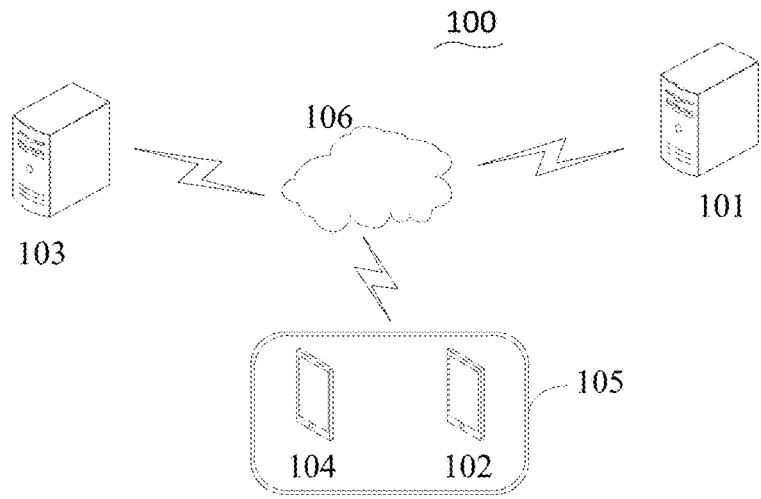
FIG. 1 is a schematic diagram of a system architecture of a multimedia system according to one embodiment of the present disclosure.

The present disclosure is described in further detail below with reference to the drawings and embodiments. It may be understood that the specific embodiments described here are merely intended to explain the related invention, rather than to limit the invention. It should also be noted that, for convenience of description, only the parts related to the present invention are shown in the drawings.

In the descriptions of the present disclosure, it needs to be noted that the terms "first", "second", and "third" are only used for distinguishing between different objects rather than describing a specific order, and cannot be construed as indicating or implying relative importance. Moreover, the terms "include", "have", and any variations thereof are intended to cover non-exclusive inclusion. For example, a process, method, system, product or device that includes a series of steps or units is not limited to the listed steps or units. On the contrary, optionally, it also includes steps or units that are not listed, or optionally also includes other steps or units inherent to the process, method, product or device.

It needs to be noted that the embodiments in the present disclosure and features in the embodiments may be combined with one another without conflict. The present disclosure is now described in detail with reference to the accompanying drawings and embodiments.

With reference to FIG. 1, FIG. 1 is a schematic diagram of a system architecture of a multimedia system 100 according to one embodiment of the present disclosure. The multimedia system 100 includes an audio-video conference system and a third-party application system, where the audio-video conference system includes an audio-video conference server 101 and an audio-video conference client 102; and the third-party application system includes a third-party application server 103 and a third-party application client 104. Here, the third-party application client 104 and the audio-video conference client 102 may be integrated together. An integration manner includes but is not limited to a hosted application and a host application. For example, the third-party application client 104 may be one hosted application in the audio-video conference client 102. In the present disclosure, the third-party application client 104 and the audio-video conference client 102 integrated together are referred to as a client 105.

Here, the audio-video conference server 101 may provide various network audio-video conference services. The audio-video conference server 101 may also provide a plurality of open Application Programming Interfaces (APIs) for the third-party application server to invoke, so that the third-party application server can use the provided audio-video conference services.

Here, the third-party application server 103 may be, for example, an interview system server, or may be an online education system server, or may also be a third-party application of other type involving audio-video conference related services, which will not be limited in the present disclosure. The third-party application server 103 may embed the audio-video conference service in the third-party application scenario by invoking the APIs provided by the audio-video conference server 101. For example, the interview system server may use the video call function by invoking the APIs provided by the audio-video conference server 101 and embed the audio-video conference service in the interview scenario.

Here, the audio-video conference server 101 and the client 105, the third-party application server 103 and the client 105, and the audio-video conference server 101 and the third-party application server 103 may be connected through a network 106 to realize information interaction. The network 106 may include various connection types, such as a wired communication link, a wireless communication link, or an optical fiber cable, etc.

The client 105 may be either hardware or software. If the client 105 is hardware, the client may be various electronic devices having a display screen and supporting sound acquisition and/or video acquisition, including but not limited to a smart phone, a tablet computer, a portable laptop computer, a desktop computer, etc. If the client 105 is software, the client may be installed in the electronic devices listed above.

The server, namely the audio-video conference server 101 and/or the third-party application server 103, may be either hardware or software. When the server is hardware, the server may be implemented as a distributed server cluster composed of a plurality of servers or may be implemented as a single server. When the server is software, the server may be implemented as multiple pieces of software or multiple software modules (for example, configured to provide distributed services), or may be implemented as a single piece of software or a single software module, which will not be particularly limited here.

Figure 2:
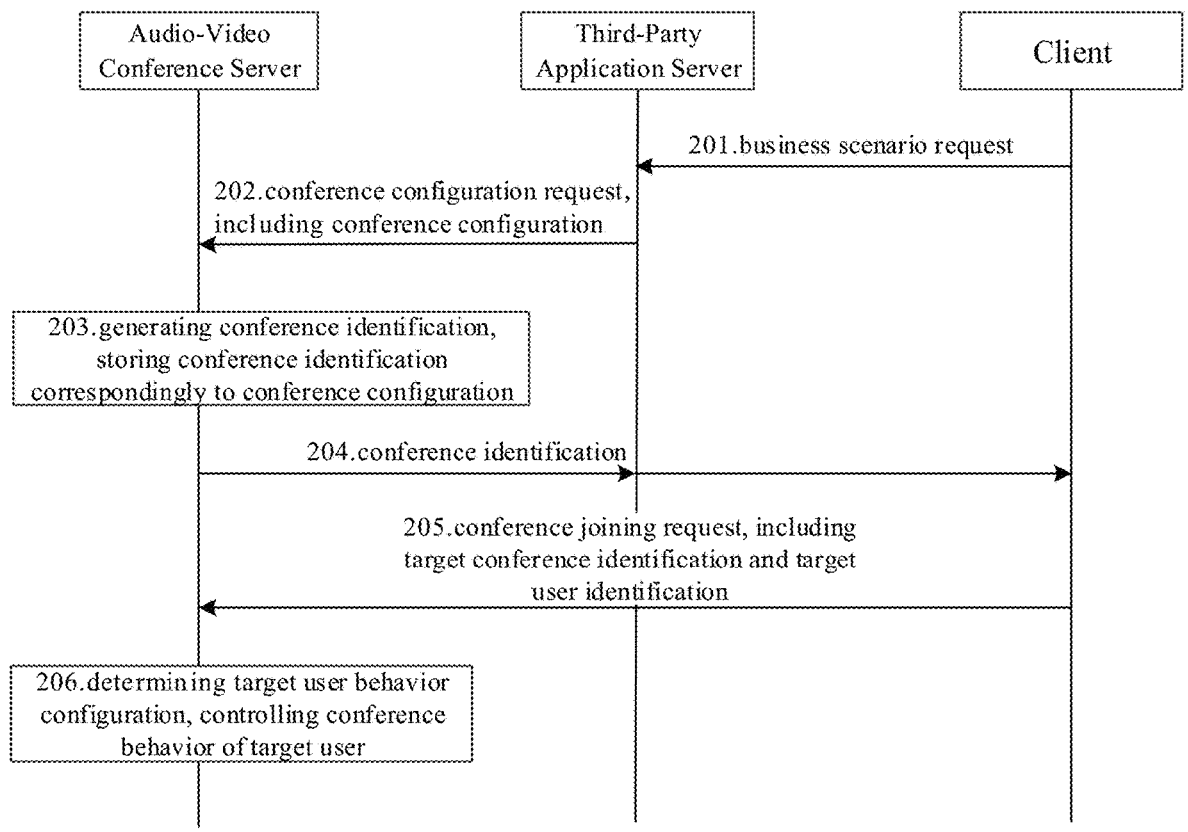
FIG. 2 is a timing diagram of a method for configuring an audio-video conference according to one embodiment of the present disclosure.
Figure 3:
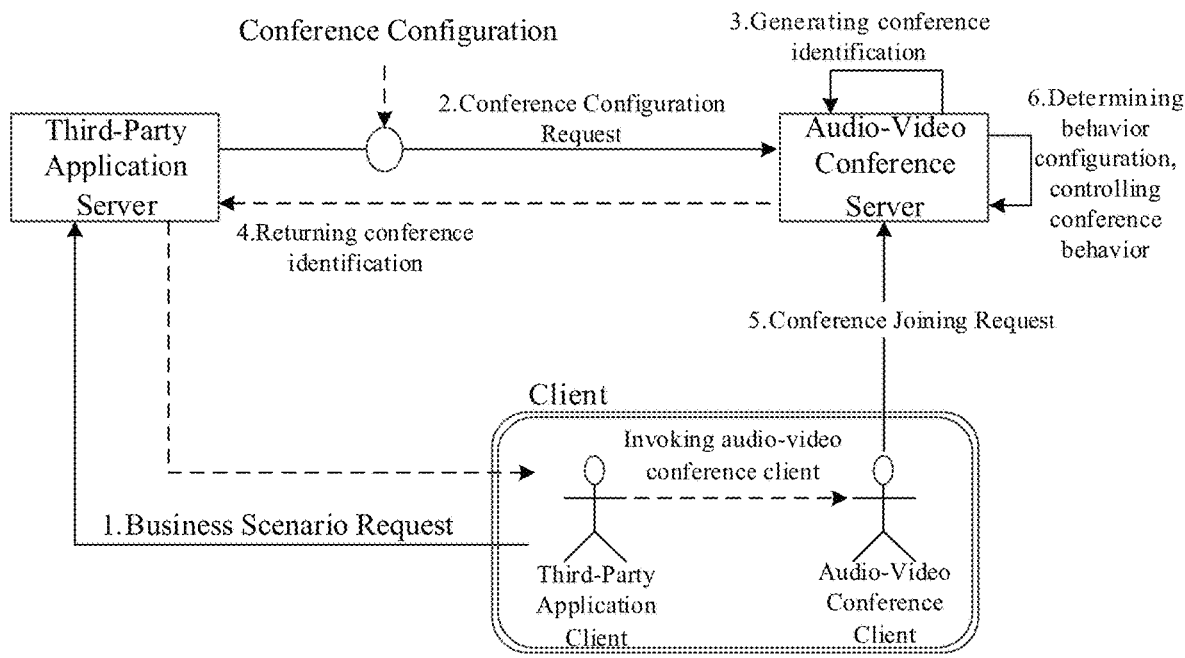
FIG. 3 is schematic diagram of an application scenario of a method for configuring an audio-video conference according to one embodiment of the present disclosure.

With reference to FIG. 2 and FIG. 3, FIG. 2 is a timing diagram of a method for configuring an audio-video conference according to one embodiment of the present disclosure, and FIG. 3 is a schematic diagram of an application scenario of a method for configuring an audio-video conference according to one embodiment of the present disclosure. The method for configuring an audio-video conference of the present disclosure may be applied to the multimedia system 100 as shown in FIG. 1, and implemented by the audio-video conference server 101 and the third-party application server 103 in the multimedia system 100.

As shown in FIG. 2 and FIG. 3, the method includes the following steps.

In step 201, the third-party application server receives a business scenario request initiated by a client.

Here, the third-party application server is often based on a certain business scenario, and divides users into a plurality of different roles based on the business scenario. Different roles need to be customized with different conference behaviors in a conference to possess different capabilities. The conference behaviors refer to different behaviors in a conference process. For example, in an interview scenario, there are roles such as an interviewer and candidates. In an online education scenario, there are roles such as a teacher and students. For example, the teacher should be able to share documents in a conference, and a student may not be able to share documents in the conference.

A user may initiate the business scenario request to the third-party application server by the client, for example, initiate an interview conference request to make an appointment to the conference. The user may specify the respective roles of a plurality of users needing to participate in the conference by carrying at least one user role configuration in the business scenario request. The user role configuration includes a role identification (ID) and a corresponding user identification. The client informs the third-party application server of the correspondence of the role identification and the user identification by sending the business scenario request carrying the user role configuration.

In step 202, the third-party application server initiates a conference configuration request to the audio-video conference server.

The audio-video conference server provides an audio-video conference service and supports customization of different conference behaviors for different users participating in a conference. The conference behaviors may be indicated by corresponding identifications. A conference behavior identification indicates a conference behavior, and a conference behavior identification set indicates at least one conference behavior.

The third-party application server may preset and store a correspondence of a role identification and a corresponding conference behavior identification set according to a requirement of the role in the conference. The correspondence is configured to define a conference behavior that can be performed by the role.

The third-party application server generates a corresponding conference configuration in response to receiving the business scenario request initiated by the client. Specifically, for each user role configuration included in the business scenario request, a conference behavior identification corresponding to the role identification in the user role configuration may be determined according to the preset correspondence of the role identification and the conference behavior identification set, and a corresponding behavior configuration may be generated based on the determined conference behavior identification and the user identification in the user role configuration. The third-party application server may generate a conference configuration based on each generated behavior configuration. The conference configuration includes at least one generated behavior configuration, and the generated behavior configuration is configured to define a conference behavior of a user indicated by at least one user identification.

Here, the conference configuration may be generated by a predefined "conference behavior configuration model". The "conference behavior configuration model" is an abstracted model obtained by abstracting the conference behaviors of participants of different roles in different scenarios according to the capability that the audio-video conference server can provide. The model may be established and released in advance by the audio-video conference server.

The third-party application server initiates, in response to receiving the business scenario request initiated by the client, the conference configuration request to the audio-video conference server after generating the conference configuration, where the conference configuration generated currently is carried in the conference configuration request and sent to the audio-video conference server. Here, the conference configuration request may be, for example, a conference appointment request initiated at a conference appointment stage, or may be other requests initiated during a conference.

Optionally, the audio-video conference server may provide a conference appointment API, and the third-party application server may initiate the conference appointment request by invoking the conference appointment API.

In step 203, the audio-video conference server generates, in response to receiving the conference configuration request initiated by the third-party application server, a conference identification corresponding to the conference configuration request and stores the conference identification correspondingly to the conference configuration.

The audio-video conference server may generate, in response to the conference configuration request, the corresponding conference identification as a certificate for the client to join in the conference subsequently. Moreover, the generated conference identification is stored correspondingly to the received conference configuration, e.g., locally stored on the audio-video conference server, or stored on other electronic device (e.g., a database server) in network connection with the audio-video conference server. Here, the conference identification includes but is not limited to at least one of a character string, a two-dimensional code, a website link, an application link (APPLINK), etc.

In step 204, the audio-video conference server returns the generated conference identification to the third-party application server, and the third-party application server sends the conference identification to a participant client corresponding to the conference configuration request.

The audio-video conference server returns the conference identification to the third-party application server such that the third-party application server distributes the conference identification to clients corresponding to the conference identification and logged in by the user identifications needing to participate in a conference, ensuring that the user indicated by each user identification can use the conference identification to join in the conference subsequently.

In step 205, the audio-video conference server receives a conference joining request initiated by a target client.

The target client is any one of at least one client participating in the conference. A target user initiates the conference joining request including a user identification and a conference identification by the target client to join in the conference indicated by the conference identification.

Here, the user identification included in the conference joining request initiated by the target client is called a target user identification, and the conference identification included therein is called a target conference identification. It may be understood that the target user may be any one of at least one user participating in the conference, and the target user identification is the user identification of the target user logging in to the target client.

Here, the client is integrated with the audio-video conference client and the third-party application client. In a specific implementation, the step of initiating the conference joining request by the target client may include:

(1) activating, by the third-party application client, the audio-video conference client by means of APPLINK and the like in response to receiving the conference identification sent by the third-party application server, and informing the audio-video conference client of the received conference identification; and (2) initiating, by the audio-video conference client, the conference joining request to the audio-video conference server using the received conference identification and the user identification.

In step 206, a target user behavior configuration is determined and the conference behavior of the target user is controlled.

There may be numerous conference identifications and corresponding conference configurations thereof stored on the audio-video conference server. When the target client initiates the conference joining request, the audio-video conference server determines, in response to receiving the conference joining request initiated by the target client that includes the target user identification and the target conference identification, a conference configuration corresponding to the target conference identification as a target conference configuration. The target conference configuration includes at least one behavior configuration. Then, the audio-video conference server may determine the behavior configuration corresponding to the target user identification from the target conference configuration as the target user behavior configuration, based on the target user identification in the conference joining request.

During a conference, the audio-video conference server may perform logic execution with the determined target user behavior configuration to control the conference behavior of the target user indicated by the target user identification, to achieve the purpose of customizing the conference behavior of the role. For example, the target user is allowed/not allowed to act as a moderator, or the target user is allowed/not allowed to adjust a conference interface, or the target user is allowed/not allowed to share documents, etc.

In some optional implementations, the behavior configuration may include a user identification set and a conference behavior identification set. For example, the behavior configuration 1 may include user identifications A and B, and conference behavior identifications A, B, and C. Determining the target user behavior configuration in step 206 may include: determining a behavior configuration matching the target user identification in the target conference configuration; and determining a conference behavior indicated by the conference behavior identification set in the determined behavior configuration as the target user behavior configuration.

Figure 4:
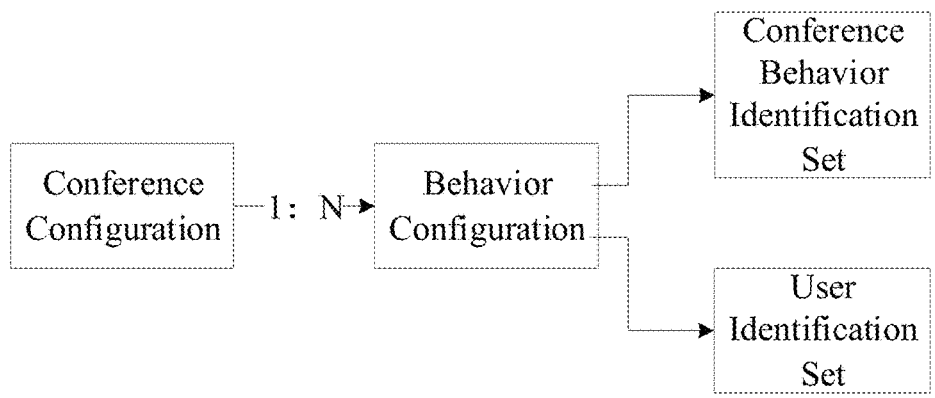
FIG. 4 is a schematic diagram of a conference behavior configuration model in some embodiments according to the present disclosure.

With reference to FIG. 4, FIG. 4 is a schematic diagram of a conference behavior configuration model in some optional implementations of the present disclosure. The third-party application server may generate a conference configuration according to the behavior configuration model, and the structure of the conference configuration is identical to the structure of the conference behavior configuration model.

The conference configuration includes behavior configurations of all roles in a conference. One behavior configuration represents a configuration for one or one type of role conference behaviors. The conference configuration is in a relationship of 1:N with the behavior configuration in quantitative terms, where N is a positive integer not less than 1. That is, one conference configuration may include at least one behavior configuration.

One behavior configuration includes one conference behavior identification set and one corresponding user identification set. The conference behavior identification set includes at least one conference behavior identification representing a configuration for conference behaviors of a role in multiple aspects and configured to define the conference behaviors of the user indicated by the user identification set in the behavior configuration. The user identification set includes a plurality of user identifications, and a plurality of users indicated belong to one or one type of roles. The audio-video conference server may discriminate which users among all the users participating in the conference are corresponding to the behavior configuration by using the user identification set. For the discriminated users, the conference behavior indicated by the conference behavior identification set in the behavior configuration may be performed for these users to achieve the purpose of customizing the conference behaviors of these users.

Further, in addition to the user identification (user ID), the user identification set may further include a tenant identification (Tenant ID) to which the user identification belongs, and a user type (UserType). When discriminating the users participating in the conference, the audio-video conference server may further discriminate the tenant identification and the user type in addition to the user identification.

Here, each conference behavior is used for characterizing different behaviors during the conference. For example, the conference behaviors include but are not limited to: CanShareMeeting (can share a meeting or conference), CanInvite (can invite other users), CanBeHost (can be a host), CanJoin (can join in a conference), etc.

Optionally, in the conference behavior configuration model, each behavior configuration may correspond to a set number (e.g., 10 or 20) of configurable conference behaviors. The set number of configurable conference behaviors are abstracted and concluded by studying various third-party application scenarios such as interview, online education, etc. For most application scenarios, the behavior configuration requirement for a particular role may be meet by selecting and configuring at least one conference behavior corresponding to the behavior configuration.

The conference behavior configuration model as shown in FIG. 4 has the following characteristics: (1) the model is decoupled from a specific role and then is applicable to any role; and (2) conference behaviors may be freely customized according to the model, and therefore, the behavior configurations for participants may be extended conveniently. Based on the two characteristics, the requirement of customizing various conference behaviors based on roles can be met efficiently.

As described above, the embodiments of the present disclosure provide a method for configuring an audio-video conference. The main technical concept of the method of the present disclosure is as follows: in the lifetime of a conference, a "configuration" part is introduced. For example, the conference is divided into two stages: appointment before the conference and during the conference. The "configuration" part is introduced at the stage of appointment before the conference. The configuration of a user behavior in an audio-video conference is realized by the "configuration" part. The third-party application server may convert role requirements thereof into a conference configuration according to the "conference behavior configuration model" by initiating the conference configuration request and submit the conference configuration to the audio-video conference server. Here, the conference configuration includes at least one behavior configuration. The behavior configuration is configured based on a role to which a user belongs, and the role to which the user belongs is determined by the third-party application server. During the conference, the audio-video conference server can control the conference behavior of the corresponding user by determining the behavior configuration corresponding to the user identification of the participating user in the conference configuration. Thus, the third-party application server may customize the corresponding behavior configuration according to the role requirements. Compared with an existing solution of providing customized roles by the audio-video conference service, the present disclosure allows for free customization of conference behaviors, solves the problem of limited customized roles, and improves the extendibility, thereby efficiently meeting the requirement of customizing various conference behaviors based on roles.

Figure 5:
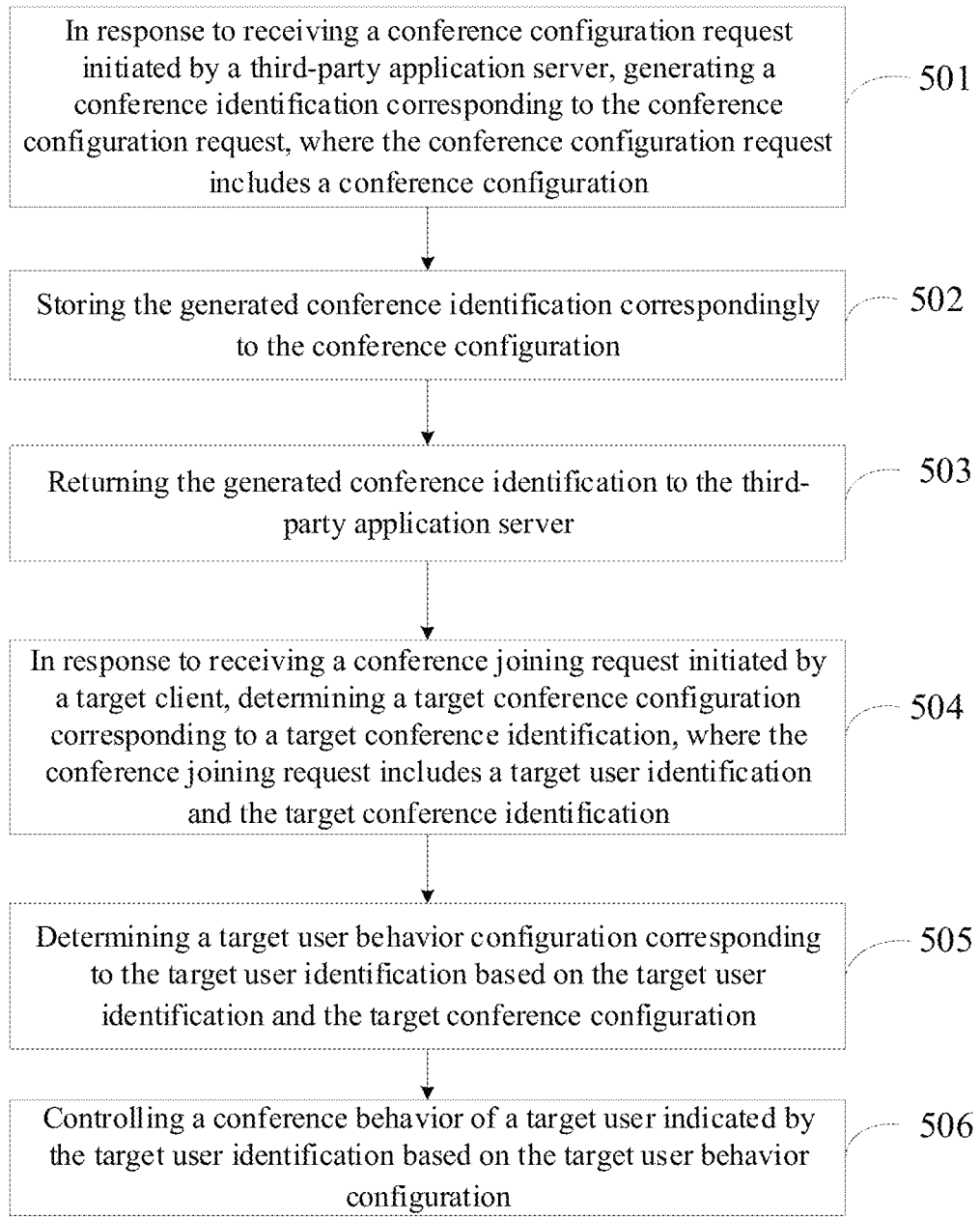
FIG. 5 is a flowchart of a method for configuring an audio-video conference applied to an audio-video conference server according to one embodiment of the present disclosure.

Referring continuously to FIG. 5, there is shown a flowchart of a method for configuring an audio-video conference applied to an audio-video conference server according to one embodiment of the present disclosure. The method for configuring an audio-video conference includes the following steps.

Step 501, in response to receiving a conference configuration request initiated by a third-party application server, generating a conference identification corresponding to the conference configuration request, where the conference configuration request includes a conference configuration, the conference configuration includes at least one behavior configuration, and the behavior configuration is configured to define a conference behavior of at least one user.

Step 502, storing the generated conference identification correspondingly to the conference configuration.

Step 503, returning the generated conference identification to the third-party application server.

It should be noted that step 503 is not limited to being performed after step 502 and may also be performed at the same time with step 502, or performed prior to step 502.

In some optional implementations, the method further includes the following steps.

Step 504, in response to receiving a conference joining request initiated by a target client, determining a target conference configuration corresponding to a target conference identification, where the conference joining request includes a target user identification and the target conference identification.

Step 505, determining a target user behavior configuration corresponding to the target user identification based on the target user identification and the target conference configuration.

Step 506, controlling a conference behavior of a target user indicated by the target user identification based on the target user behavior configuration.

In some optional implementations, the behavior configuration includes a user identification set and a conference behavior identification set; and step 505 may include: determining a behavior configuration matching the target user identification in the target conference configuration; and determining a conference behavior indicated by a conference behavior identification set in the determined behavior configuration as the target user behavior configuration.

In some optional implementations, step 506 may include: determining whether the target user meets a condition for performing the conference behavior corresponding to the target user behavior configuration based on at least one of the target user identification, a tenant identification to which the target user belongs, and a user type of the target user; and controlling the conference behavior of the target user based on the target user behavior configuration in response to determining that the target user meets the condition.

In the present embodiment, the specific operations of steps 501 to step 506 and the resulting technical effects may become obvious with reference to the related descriptions of step 201 to step 206 in the embodiments shown in FIG. 2 and FIG. 3, which will not be described redundantly herein.

Figure 6:
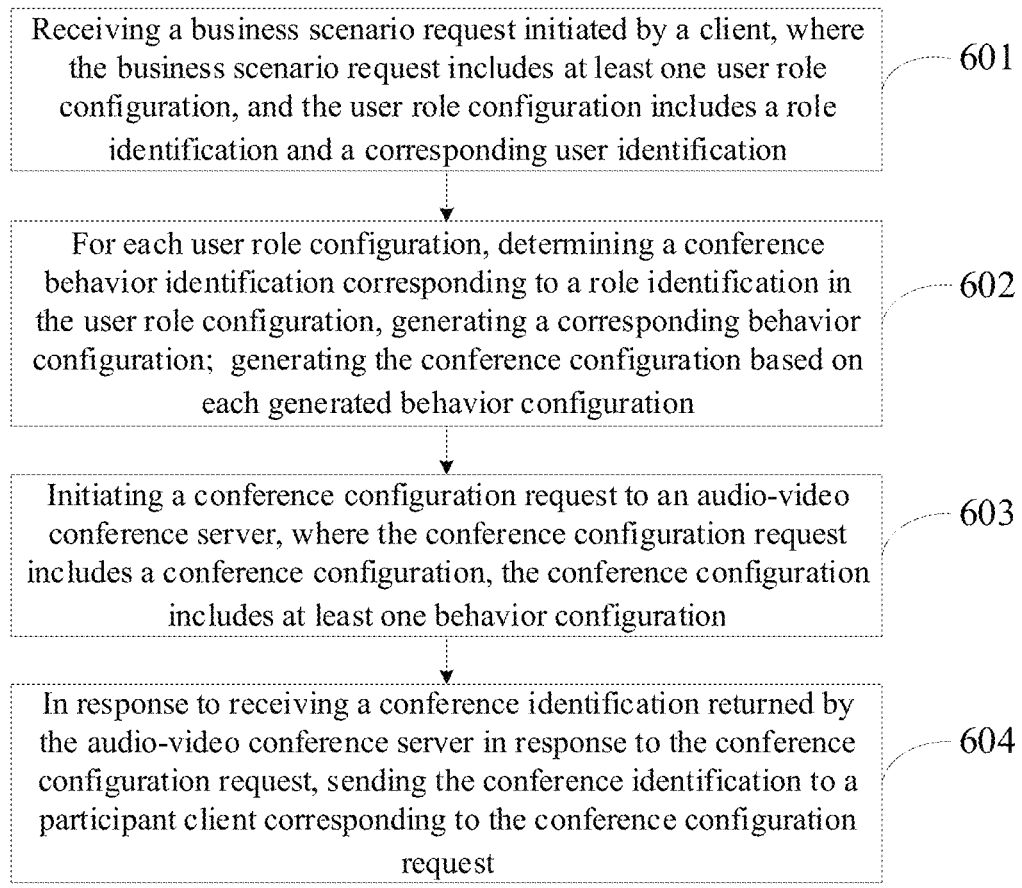
FIG. 6 is a flowchart of a method for configuring an audio-video conference applied to a third-party application server according to one embodiment of the present disclosure.

Referring continuously to FIG. 6, there is shown a flowchart of a method for configuring an audio-video conference applied to a third-party application server according to one embodiment of the present disclosure. The method for configuring an audio-video conference includes the following steps.

Step 601, receiving a business scenario request initiated by a client, where the business scenario request includes at least one user role configuration, and the user role configuration includes a role identification and a corresponding user identification.

Step 602, for each user role configuration, determining a conference behavior identification corresponding to a role identification in the user role configuration according to a preset correspondence between a role identification and a conference behavior identification set, and generating a corresponding behavior configuration based on the determined conference behavior identification and a user identification in the user role configuration; and generating the conference configuration based on each generated behavior configuration.

Step 603, initiating a conference configuration request to an audio-video conference server, where the conference configuration request includes a conference configuration, the conference configuration includes at least one behavior configuration, and the behavior configuration is configured to define a conference behavior of at least one user.

Step 604, in response to receiving a conference identification returned by the audio-video conference server in response to the conference configuration request, sending the conference identification to a participant client corresponding to the conference configuration request, where the participant client initiates a conference joining request to the audio-video conference server based on the conference identification.

In the present embodiment, the specific operations of steps 601 to step 604 and the resulting technical effects may become obvious with reference to the related descriptions of step 201 to step 206 in the embodiments shown in FIG. 2 and FIG. 3, which will not be described redundantly herein.

Figure 7:
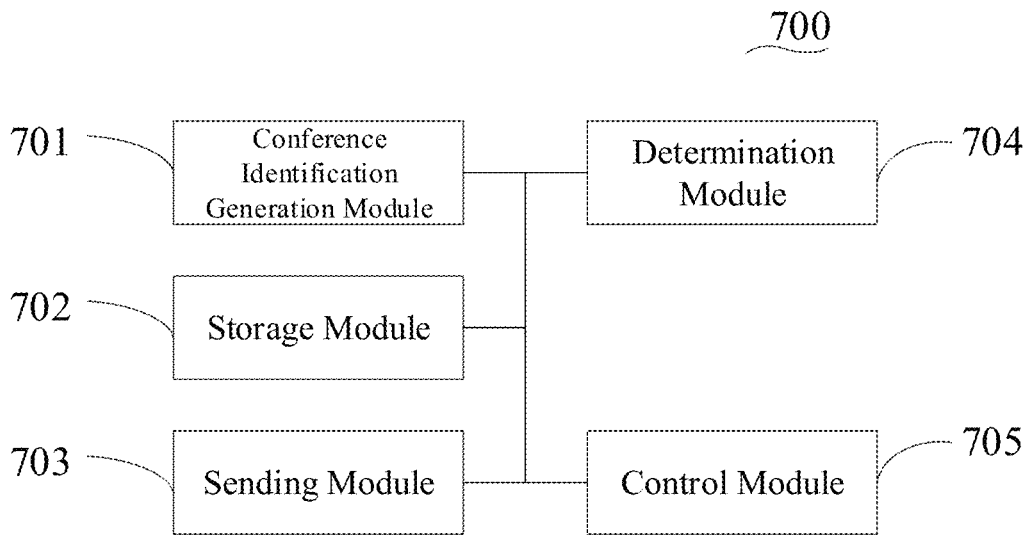
FIG. 7 is a schematic structural diagram of an apparatus for configuring an audio-video conference applied to an audio-video conference server according to one embodiment of the present disclosure.

With reference to FIG. 7, FIG. 7 is a schematic structural diagram of an apparatus 700 for configuring an audio-video conference applied to an audio-video conference server according to one embodiment of the present disclosure. The apparatus embodiment may be applied to implement the method embodiment as shown in FIG. 5. The apparatus may be specifically applied to various electronic devices. As shown in FIG. 7, the apparatus 700 may include:

a conference identification generation module 701 configured to, in response to receiving a conference configuration request initiated by a third-party application server, generate a conference identification corresponding to the conference configuration request, where the conference configuration request comprises a conference configuration, the conference configuration comprises at least one behavior configuration, and the behavior configuration is configured to define a conference behavior of at least one user;

a storage module 702 configured to store the generated conference identification correspondingly to the conference configuration; and a sending module 703 configured to return the generated conference identification to the third-party application server.

In some optimal implementations, the apparatus may further include:

a determination module 704 configured to: in response to receiving a conference joining request initiated by a target client, determine a target conference configuration corresponding to a target conference identification, where the conference joining request includes a target user identification and the target conference identification; and determine a target user behavior configuration corresponding to the target user identification based on the target user identification and the target conference configuration; and a control module 705 configured to control a conference behavior of a target user indicated by the target user identification based on the target user behavior configuration.

In some optimal implementations, the behavior configuration includes a user identification set and a conference behavior identification set; and the determination module 704 is further configured to determine a behavior configuration matching the target user identification in the target conference configuration, and determine a conference behavior indicated by a conference behavior identification set in the determined behavior configuration as the target user behavior configuration.

In some optimal implementations, the control module 705 is further configured to: determine whether the target user meets a condition for performing the conference behavior corresponding to the target user behavior configuration based on at least one of the target user identification, a tenant identification to which the target user belongs, and a user type of the target user; and control the conference behavior of the target user based on the target user behavior configuration in response to determining that the target user meets the condition.

In the present embodiment, the specific processing of the modules of the apparatus 700 and the resulting technical effects may become obvious with reference to the related descriptions of step 201 to step 206 in the embodiments shown in FIG. 2 and FIG. 3, which will not be described redundantly herein.

Figure 8:
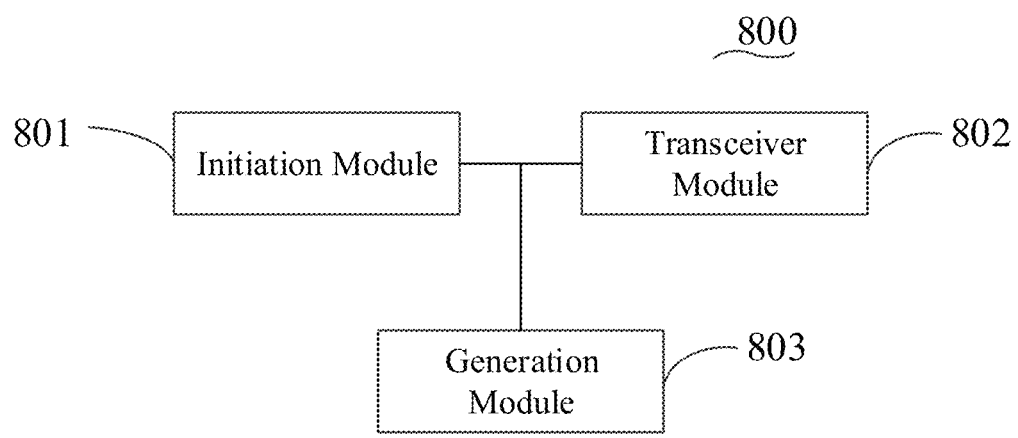
FIG. 8 is a schematic structural diagram of an apparatus for configuring an audio-video conference applied to a third-party application server according to one embodiment of the present disclosure.

With reference to FIG. 8, FIG. 8 is a schematic structural diagram of an apparatus 800 for configuring an audio-video conference applied to a third-party application server according to one embodiment of the present disclosure. The apparatus embodiment may be applied to implement the method embodiment as shown in FIG. 6. The apparatus 800 may be specifically applied to various electronic devices. As shown in FIG. 8, the apparatus 800 may include:

an initiation module 801 configured to initiate a conference configuration request to an audio-video conference server, where the conference configuration request includes a conference configuration, the conference configuration includes at least one behavior configuration, and the behavior configuration is configured to define a conference behavior of at least one user; and a transceiver module 802 configured to, in response to receiving a conference identification returned by the audio-video conference server in response to the conference configuration request, send the conference identification to a participant client corresponding to the conference configuration request, where the client initiates a conference joining request to the audio-video conference server based on the conference identification.

In some optimal implementations, the transceiver module 802 is further configured to receive a business scenario request initiated by a client, where the business scenario request includes at least one user role configuration, and the user role configuration includes a role identification and a corresponding user identification; and the apparatus may further include:

a generation module 803 configured to: for each user role configuration, determine a conference behavior identification corresponding to a role identification in the user role configuration according to a preset correspondence of a role identification and a conference behavior identification set, and generate a corresponding behavior configuration based on the determined conference behavior identification and the user identification in the user role configuration; and generate the conference configuration based on each generated behavior configuration.

In the present embodiment, the specific processing of the modules of the apparatus 800 and the resulting technical effects may become obvious with reference to the related descriptions of step 201 to step 206 in the embodiments shown in FIG. 2 and FIG. 3, which will not be described redundantly herein.

Figure 9:
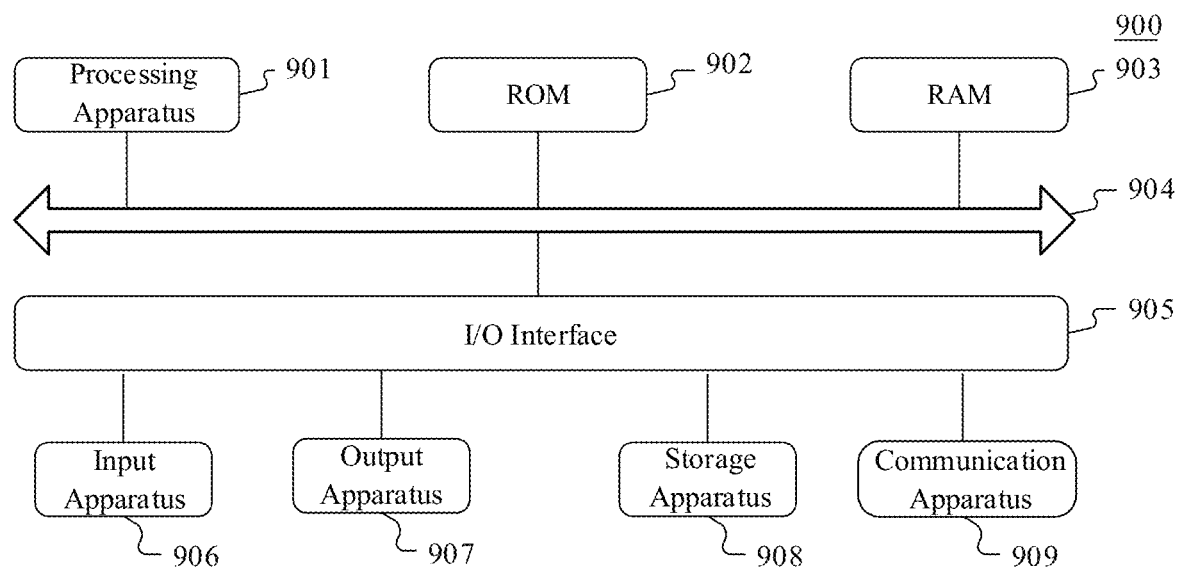
FIG. 9 is a schematic structural diagram of a computer system for implementing a server according to one embodiment of the present disclosure.

With reference to FIG. 9, FIG. 9 is a schematic structural diagram of a computer system 900 for a server of the present disclosure. As shown in FIG. 9, the computer system 900 includes:

one or more processors 901; and a storage unit 908 on which one or more programs are stored.

The one or more programs, when executed by the one or more processors 901, cause the one or more processors 901 to implement the method disclosed in the embodiment as shown in FIG. 5 or the method disclosed in the embodiment as shown in FIG. 6.

The present disclosure further provides a computer-readable storage medium on which a computer program is stored. The computer program, when executed by one or more processors, implements the method disclosed in the embodiment as shown in FIG. 5 or the method disclosed in the embodiment as shown in FIG. 6.

It needs to be noted that the computer system 900 shown in FIG. 9 is merely one example and shall not impose any limitation on the function and the use range of the embodiments of the present disclosure.

The processor 901 of the computer system 900 includes but is not limited to a central processing unit and a graphics processing unit, which can perform various suitable actions and processing according to a program stored in a read-only memory (ROM) 902 or a program loaded from a storage apparatus 908 into a random-access memory (RAM) 903. The RAM 903 further stores various programs and data required for operations of the computer system 900. The processing apparatus 901, the ROM 902, and the RAM 903 are interconnected through a bus 904. An input/output (I/O) interface 905 is also connected to the bus 904.

Usually, the following apparatuses may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a loudspeaker, a vibrator, or the like; a storage apparatus 908 including, for example, a magnetic tape, a hard disk, or the like; and a communication apparatus 909. The communication apparatus 909 may allow the computer system 900 to be in wireless or wired communication with other devices to exchange data. While FIG. 9 illustrates the computer system 900 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 909 and installed, or may be installed from the storage apparatus 908, or may be installed from the ROM 902. When the computer program is executed by the processing apparatus 901, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

It should be noted that the computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

The invention claimed is:

1. A method for configuring an audio-video conference, comprising:
    in response to receiving a conference configuration request initiated by a third-party application server, generating a conference identification corresponding to the conference configuration request, wherein the conference configuration request comprises a conference configuration, the conference configuration comprises at least one behavior configuration, and the behavior configuration is configured to define a conference behavior of at least one user;
    storing the generated conference identification correspondingly to the conference configuration;
    returning the generated conference identification to the third-party application server,
    in response to receiving a conference joining request initiated by a target client, determining a target conference configuration corresponding to a target conference identification, wherein the conference joining request comprises a target user identification and the target conference identification;

determining a target user behavior configuration corresponding to the target user identification based on the target user identification and the target conference configuration; and controlling a conference behavior of a target user indicated by the target user identification based on the target user behavior configuration, wherein the behavior configuration comprises a user identification set and a conference behavior identification set, wherein the conference behavior identification set comprises at least one conference behavior identification; and the determining the target user behavior configuration corresponding to the target user identification based on the target user identification and the target conference configuration, comprises:

determining a behavior configuration matching the target user identification in the target conference configuration; and determining a conference behavior indicated by a conference behavior identification set in the determined behavior configuration as the target user behavior configuration.

2. The method according to claim 1, wherein the controlling a conference behavior of the target user indicated by the target user identification based on the target user behavior configuration, comprises:

determining whether the target user meets a condition for performing the conference behavior corresponding to the target user behavior configuration based on at least one of the target user identification, a tenant identification to which the target user belongs, and a user type of the target user; and controlling the conference behavior of the target user based on the target user behavior configuration in response to determining that the target user meets the condition.

3. The method according to claim 1, wherein the behavior configuration is configured based on a role to which a user belongs, and the role to which the user belongs is determined by the third-party application server.

4. A method for configuring an audio-video conference, comprising:

initiating a conference configuration request to an audio-video conference server, wherein the conference configuration request comprises a conference configuration, the conference configuration comprises at least one behavior configuration, and the behavior configuration is configured to define a conference behavior of at least one user; and in response to receiving a conference identification returned by the audio-video conference server in response to the conference configuration request, sending the conference identification to a participant client corresponding to the conference configuration request, wherein the participant client initiates a conference joining request to the audio-video conference server based on the conference identification, wherein the conference identification is stored correspondingly to the conference configuration;

wherein a target conference configuration corresponding to a target conference identification is determined, wherein the conference joining request comprises a target user identification and the target conference identification;

a target user behavior configuration corresponding to the target user identification is determined based on the target user identification and the target conference configuration;

a conference behavior of a target user indicated by the target user identification is controlled based on the target user behavior configuration;

wherein the behavior configuration comprises a user identification set and a conference behavior identification set, wherein the conference behavior identification set comprises at least one conference behavior identification;

a behavior configuration matching the target user identification is determined in the target conference configuration; and a conference behavior indicated by a conference behavior identification set in the determined behavior configuration is determined as the target user behavior configuration.

5. The method according to claim 4, wherein before the initiating the conference configuration request to the audio-video conference server, the method further comprises:

receiving a business scenario request initiated by a client, wherein the business scenario request comprises at least one user role configuration, and the user role configuration comprises a role identification and a corresponding user identification;

for each user role configuration, determining a conference behavior identification corresponding to a role identification in the user role configuration according to a preset correspondence between a role identification and a conference behavior identification set, and generating a corresponding behavior configuration based on the determined conference behavior identification and a user identification in the user role configuration; and generating the conference configuration based on each generated behavior configuration.

6. A server, comprising:

one or more processors; and a storage apparatus, on which one or more programs are stored, wherein the one or more programs, when executed by the one or more processors, cause the one or more processors to implement a method for configuring an audio-video conference, and the method comprises:

in response to receiving a conference configuration request initiated by a third-party application server, generating a conference identification corresponding to the conference configuration request, wherein the conference configuration request comprises a conference configuration, the conference configuration comprises at least one behavior configuration, and the behavior configuration is configured to define a conference behavior of at least one user;

storing the generated conference identification correspondingly to the conference configuration;

returning the generated conference identification to the third-party application server;

in response to receiving a conference joining request initiated by a target client, determining a target conference configuration corresponding to a target conference identification, wherein the conference joining request comprises a target user identification and the target conference identification;

determining a target user behavior configuration corresponding to the target user identification based on the target user identification and the target conference configuration; and controlling a conference behavior of a target user indicated by the target user identification based on the target user behavior configuration, wherein the behavior configuration comprises a user identification set and a conference behavior identification set, wherein the conference behavior identification set comprises at least one conference behavior identification; and the determining the target user behavior configuration corresponding to the target user identification based on the target user identification and the target conference configuration, comprises:

determining a behavior configuration matching the target user identification in the target conference configuration; and determining a conference behavior indicated by a conference behavior identification set in the determined behavior configuration as the target user behavior configuration.

7. The server according to claim 6, wherein the controlling a conference behavior of the target user indicated by the target user identification based on the target user behavior configuration, comprises:

determining whether the target user meets a condition for performing the conference behavior corresponding to the target user behavior configuration based on at least one of the target user identification, a tenant identification to which the target user belongs, and a user type of the target user; and controlling the conference behavior of the target user based on the target user behavior configuration in response to determining that the target user meets the condition.

8. The server according to claim 6, wherein the behavior configuration is configured based on a role to which a user belongs, and the role to which the user belongs is determined by the third-party application server.

9. A server, comprising:
one or more processors; and
a storage apparatus, on which one or more programs are stored,
wherein the one or more programs, when executed by the one or more processors, cause the one or more processors to implement the method according to claim 4.

10. A server, comprising:
one or more processors; and
a storage apparatus, on which one or more programs are stored,
wherein the one or more programs, when executed by the one or more processors, cause the one or more processors to implement the method according to claim 5.

11. A non-transitory computer-readable storage medium, on which a computer program is stored, wherein the computer program, when executed by one or more processors, implements the method according to claim 1.

12. A non-transitory computer-readable storage medium, on which a computer program is stored, wherein the computer program, when executed by one or more processors, implements the method according to claim 4.

* * * * *